United States Patent
Pell et al.

(10) Patent No.: US 10,481,922 B2
(45) Date of Patent: Nov. 19, 2019

(54) FAST PROVISIONING OF A MULTI-FUNCTION DEVICE

(71) Applicant: Facebook, Inc., Menlo Park, CA (US)

(72) Inventors: Oliver Pell, London (GB); Dmitry Vnukov, London (GB)

(73) Assignee: Facebook, Inc., Menlo Park, CA (US)

(*) Notice: Subject to any disclaimer, the term of this patent is extended or adjusted under 35 U.S.C. 154(b) by 184 days.

(21) Appl. No.: 15/812,861

(22) Filed: Nov. 14, 2017

(65) Prior Publication Data
US 2019/0146811 A1    May 16, 2019

(51) Int. Cl.
*G06F 9/44* (2018.01)
*G06F 9/445* (2018.01)
*G06N 5/02* (2006.01)

(52) U.S. Cl.
CPC .......... *G06F 9/44505* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,986,344 B1* | 7/2011 | Ishii | ............... | H04N 1/00204 348/211.3 |
| 10,122,577 B1* | 11/2018 | Rykowski | ........... | H04L 41/0806 |
| 2004/0010574 A1* | 1/2004 | Cammick | ............... | H04L 29/06 709/222 |
| 2005/0198233 A1* | 9/2005 | Manchester | ........ | H04L 41/0213 709/221 |
| 2015/0302453 A1* | 10/2015 | Tietzen | ............... | G06Q 30/0226 705/14.27 |
| 2015/0363576 A1* | 12/2015 | Medvinsky | ............. | G06F 21/10 726/26 |
| 2019/0050120 A1* | 2/2019 | Millhouse | .......... | G06Q 10/0833 |

\* cited by examiner

*Primary Examiner* — Danny Chan
(74) *Attorney, Agent, or Firm* — Fenwick & West LLP

(57) ABSTRACT

A client management server predicts a desired configuration of clients deployed in an enterprise based on various signals. This prediction is a best guess for a desired functionality of the client from a predefined set of possible functionalities (e.g., wayfinding, room management, dashboard, sign-in kiosk, digital sign, and point of sale terminal). Based on this prediction, the client management server facilitates provisioning of the clients with a configuration that supports the predicted functionality. The client management server may populate configuration fields located on an administrator client. An administrator can review the populated configuration fields and confirm that the predicted configuration is correct by sending a confirmation signal back to the central server. Upon receiving confirmation from the administrator client, the central server can provision the client with the predicted configuration. Otherwise, the administrator can modify the configuration fields in order to reflect the intended functionality of the client.

20 Claims, 4 Drawing Sheets

FAST PROVISIONING OF A MULTI-FUNCTION DEVICE

BACKGROUND

This disclosure relates generally to a device management system, and specifically to a provisioning system for quickly provisioning devices with minimal user input.

As computer devices become less expensive, enterprises are deploying increased numbers of devices throughout enterprise facilities. For example, enterprises may use electronic displays in place of physical signage, and may provide various portal devices at locations throughout the facilities to enable individuals to access information or perform other tasks. In some instances, a general purpose device may be configurable to serve multiple different functions such as, for example, a wayfinder, a sign-in kiosk, or remote control device. Management of clients in a business environment is important to ensure that each client is functioning as intended. Conventionally, clients can be assigned particular functionalities, or provisioned, by an administrator by manually filling in configuration fields on an administrator client. However, filling in these configuration fields manually can be time-consuming, especially in a business environment that utilizes a large number of clients. Therefore, a more advanced enterprise computing environment is desired.

SUMMARY

An enterprise computing environment connects a central server to clients deployed throughout a business establishment and predicts how the clients might be used based on transmitted signals from each device. Based on this prediction, the central server provisions the clients, or a target client, with a configuration that supports the predicted functionality by populating configuration fields located on an administrator client. A user, such as an administrator, can review the populated configuration fields and confirm that the predicted configuration is correct by sending a confirmation signal back to the central server. Upon receiving confirmation from the administrator client, the central server can provision the client with the predicted functionality. However, if the predicted configuration is incorrect, the user can modify the configuration fields in order to reflect the intended functionality of the client. The user can send this modified configuration to the central server that can subsequently provision the client accordingly.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An enterprise computing environment includes multiple deployed clients that may each be configured to serve a particular function within the environment. The clients are each coupled to a client management server that communicates with and manages functions of the clients. When first deploying a client or re-deploying a client to serve a new function, the client management server communicates with the clients over a network in order to provision the clients quickly and easily with minimal input from an administrator. The client management server can collect signals generated by each client, and determine a best guess for the type of functionality each client will most likely be assigned. For example, functionalities assigned to the clients might include wayfinding, room management, dashboard, sign-in kiosk, digital sign, and point of sale terminal functionalities. The client management server determines which functionality is most likely to be assigned based on the various signals, and prepopulates configuration fields located on the administrator client, saving the administrator time by completing this task automatically. With the configuration fields pre-populated, the administrator need only confirm the predicted configuration or modify the predicted configuration to accommodate the desired functionality.

System Architecture

Figure 1:
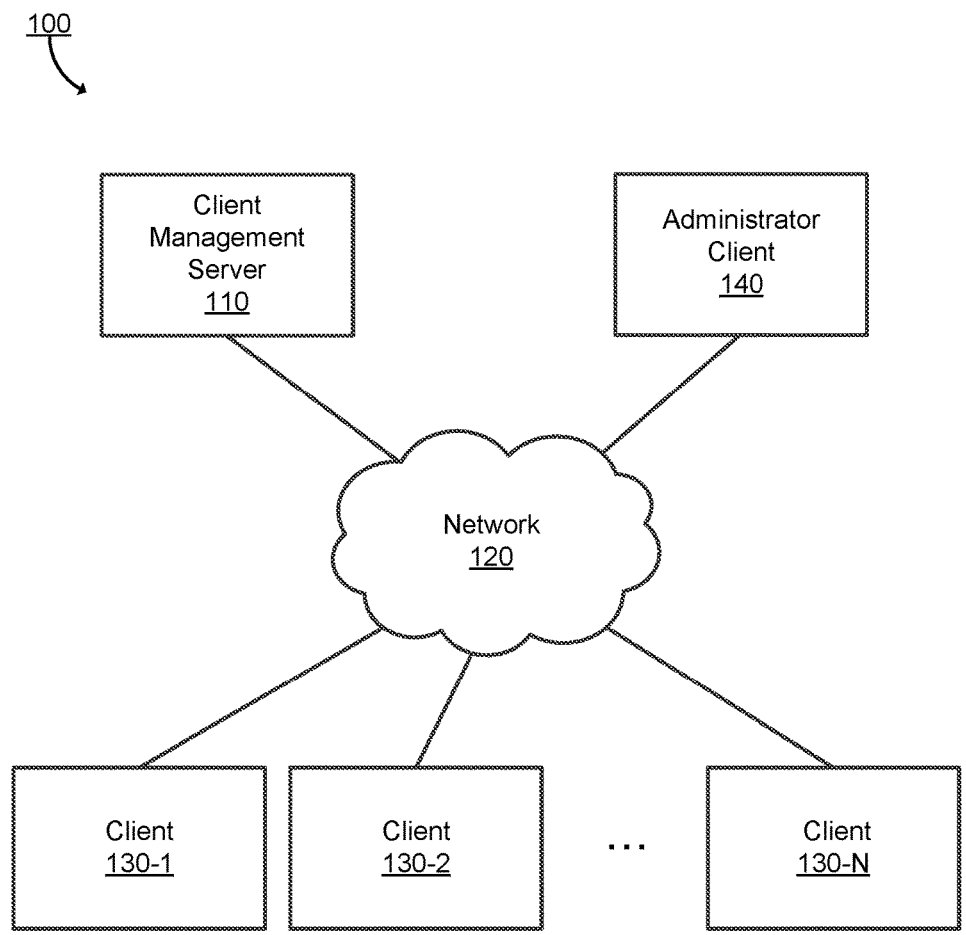
FIG. 1 is a block diagram of a system environment for an enterprise computing environment in accordance with an embodiment.

FIG. 1 is a block diagram of an enterprise computing environment 100. The enterprise computing environment 100 comprises a client management server 110, a network 120, a plurality of client devices 130-1 through 130-N (collectively referred to herein as clients 130), and an administrator client 140. In alternative configurations, different and/or additional components may be included in the enterprise computing environment 100.

The clients 130 are network-enabled computing devices capable of communicating data over the network 120, receiving user input, and outputting information to users. In one embodiment, the clients 130 may comprise specialized computing devices having functionality limited to that sufficient to perform the functions described herein. For example, the client 130 may be configured to execute a simple operating system and a relatively lightweight client application without necessarily being able to execute other more general applications. Furthermore, the client 130 may have hardware sufficient to execute the client application without necessarily including more complex general purpose hardware. Thus, the clients 130 may be constructed at relatively low cost and complexity compared to a general purpose computing device since they are customized to perform a limited number of specialized functions. In another embodiment, a client 130 may comprise a conventional general purpose computer system. In these embodiments, the client 130 may comprise hardware and software associated with general computing systems. Here, the client 130 may execute a client application that enables it to perform functions of the client 130 described herein, but may also perform other more general functions. For example, a client 130 may comprise a laptop computer, tablet, smartphone, or smartwatch that executes a client application. In other embodiments, the client 130 may include additional, fewer, or different components.

The clients 130 may be provisioned to support a particular functionality from a predefined set of possible functionalities. Here, each functionality corresponds to a particular configuration of a client application executing on the client 130 that may control how the client 130 operates and may dictate the functions or set of functions performed by the client 130. Different configurations may cause different versions of the client application to be installed or executed on a client 130. In one embodiment, possible functionalities that a client 130 might support include a wayfinder, a room management device, a dashboard device, a sign-in kiosk, a digital sign, and a point of sale terminal. In this embodiment, the wayfinder functionality may include displaying an interactive map on a client 130, or an external display screen connected to a client 130, through which users may receive directions to various destinations or points of interest within an enterprise or business establishment (e.g., shopping mall, office building, theme park, and the like). The room management functionality may include provisioning clients 130 with features associated with managing meeting rooms, such as providing meeting attendees with control over display screens and lighting. The dashboard functionality may include displaying icons for applications available on a client 130 or widgets displaying information relevant to the client's 130 environment. The client 130 may serve the sign-in kiosk functionality by providing guests of an enterprise or business establishment with an interface displaying alphanumeric characters with which a guest or attendee may sign-in, register, or otherwise document an arrival or departure. The digital sign functionality may include provisioning clients 130 to serve as signs throughout an enterprise or business establishment. The point of sale functionality may allow a client 130 to serve as a digital register or check out device in a retail environment such as a café or gift shop. A client 130 may be provisioned when it is first deployed, or it may be re-deployed in a different configuration. Provisioning may take place via a user interface on the client 130 itself or on a separate administrative client 140.

The client management server 110 is a computing device that facilitates quick provisioning of the clients 130 when they are first deployed or re-deployed by predicting a desired configuration for the clients 130. In order to predict a configuration for the clients 130, the client management server 110 collects signals generated by the clients 130 and sent over the network 120 and uses these signals to predict the likelihood of a particular configuration being assigned to the clients 130 by an administrator. The client management server 110 prepopulates configuration fields describing this predicted configuration. In one embodiment, the configuration fields may be displayed within a user interface on an administrator client 140 (e.g., smartphone, tablet computer, or any such portable computing device) that is operated by an administrator. In this embodiment, the administrator can simply confirm the predicted configuration prepopulated within the configuration fields, or modify the predicted configuration to reflect the intended use for the clients 130. Upon receiving this confirmation, or modification, from the administrator client 140, the client management server 110 subsequently provisions the clients 130 with the specified configuration. In another embodiment, the configuration fields are located within a user interface displayed on the clients 130, and the administrator can confirm or modify the predicted configuration displayed in the configuration fields on each client 130. In this embodiment, the client management server 110 can receive the confirmation or modification from the client 130, and provision the clients 130 with the specified functionality. In yet another embodiment, the client management server 110 can provision clients 130 without confirmation from an administrator.

The client management server 110 can obtain information relating to the physical orientation of a client 130, the location of a client 130, historical usage of a client 130, and external devices attached to a client 130 to predict an intended use for the client 130. For example, the client management server 110 can identify if a client 130 is mounted vertically on a wall or laying horizontally on a table by determining the client's 130 orientation in relation to its spatial environment. In addition, the client management server 110 can determine a client's 130 location within an enterprise or business establishment, for example, similar to a point within a coordinate map. The client management server 110 can also identify a history of previous configurations for a given client 130, or clients 130, and can determine the respective accuracy of former predictions made for each configuration (e.g., administrator confirmed prediction or modified prediction). If an external device is connected to a client 130, the client management server 110 can identify this connection in addition to the type of device connected to the client 130 (e.g., external display screen, keyboard, mouse, and the like). The client management server 110 can use this collected information in various combinations to predict a configuration for a client 130 that most likely supports its intended use, and can provision the client 130 with the predicted configuration.

In addition, the client management server 110 can monitor configurations for each client 130 in order to maintain a collective record of configurations for provisioned clients 130. The client management server 110 can use this record of configurations for provisioned clients 130 to predict the likelihood of a particular configuration for a client 130 in need of configuration. For example, if 50 clients 130 within a business establishment have been configured to operate as room management clients 130, the client management server 110 can identify that the next client 130 to be configured will most likely be configured as a room management client 130. The client management server 110 can prepopulate the configuration fields on the administrator client 140 with settings corresponding to room management functionality, and the administrator can accept the predicted configuration if correctly predicted. The client management server 110 is described further below with respect to FIG. 3.

The network 120 facilitates communications between the clients 130, the client management server 110, and the administrator client 140. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable encryption technique.

Figure 2:
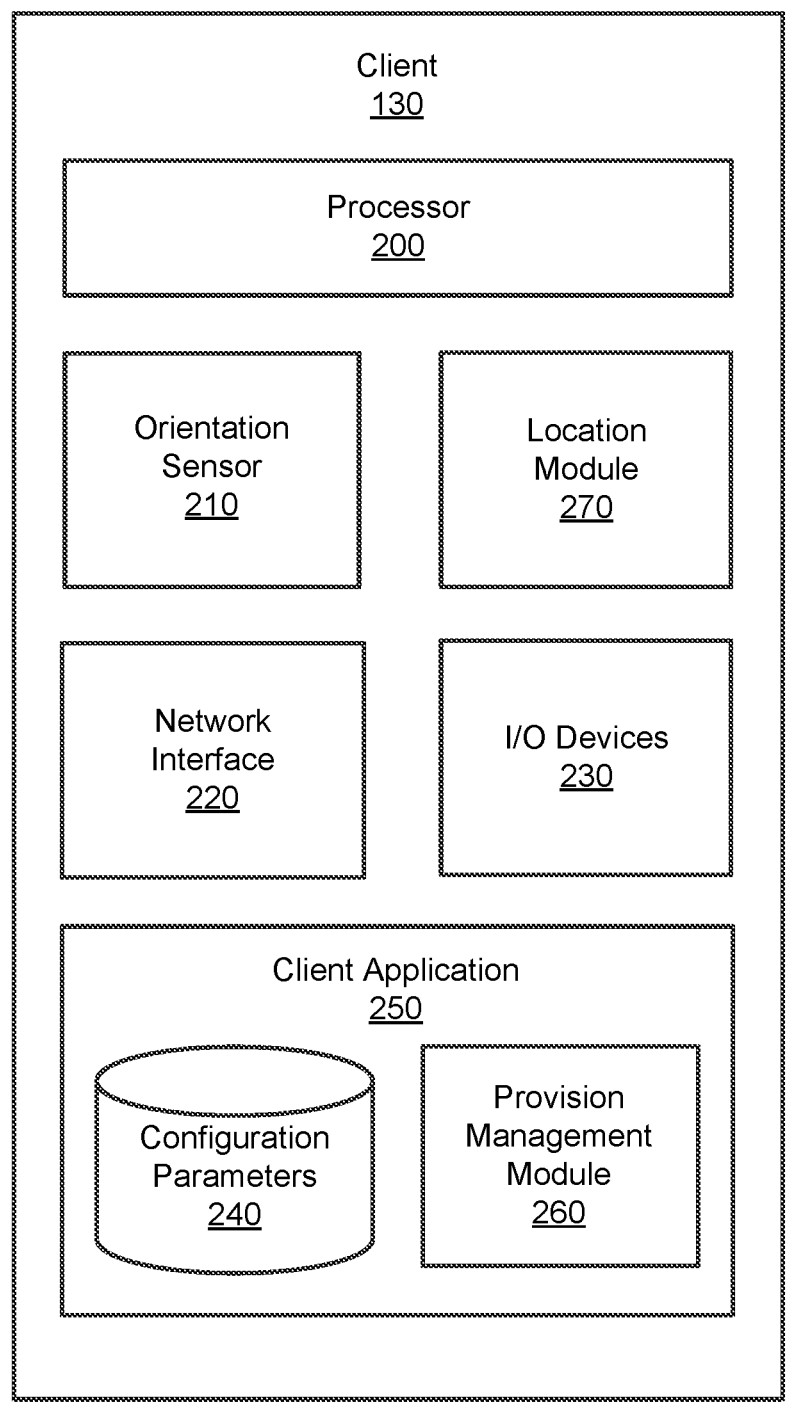
FIG. 2 is a block diagram of a client in accordance with an embodiment.

FIG. 2 is a block diagram of a client 130, according to an embodiment. The client 130 includes a processor 200, an orientation sensor 210, a location module 270, a network interface 220, I/O devices 230, and a client application 250 (which may be embodied as instructions stored to a computer-readable storage medium). The client application 250 includes a provision management module 260 and storage containing configuration parameters 240. Different clients 130 may be provisioned with different functionalities based on signals, or a combination of signals, generated by each client 130 and other information indicative of the intended usage. For example, a client 130 can determine its orientation, location, nearby users, and attachments to external devices and communicate these signals over the network 120 to the client management server 110. The client management server 110 can use these signals to predict a configuration for the client 130. Once provisioned with a configuration, a client 130 can execute a functionality supported by the provisioned configuration.

The orientation sensor 210 determines a physical orientation of the client 130. In one embodiment, the orientation sensor 210 can identify if a client 130 is mounted on a wall (e.g., by detecting that the plane of the screen is perpendicular to the ground) or laying on a horizontal surface such as a table top (e.g., by detecting that the plane of the screen is parallel to the ground). If the client 130 is wall-mounted, the orientation sensor 210 may determine if it is oriented in a "landscape" orientation (in which the long edges of the display are parallel to the ground) or a "portrait" orientation (in which the short edges of the display are parallel to the ground). Furthermore, the orientation sensor 210 may determine, relative to a predefined reference edge) if the client 130 is positioned vertically (e.g., the reference edge is closer to the ground than the non-reference edge) or horizontally in orientation (e.g., the reference edge further from the ground than the non-reference edge). For example, if the client 130 is mounted on a wall for display (e.g., in a conference room during a meeting), its orientation may be positioned vertically. In this example, the orientation sensor 210 can detect this orientation, and the client 130 may send a signal to the client management server 110 indicating that the client 130 is oriented vertically. In one embodiment, the orientation sensor 210 is a gyroscope located inside the client 130 that detects the client's 130 orientation. In another embodiment, the orientation sensor 210 may be an accelerometer used to identify movement of the client 130, from which the orientation can be derived.

The location module 270 determines a physical location of a client 130. In one embodiment, the location module 270 is based on a network topology of all devices connected to the network 120 within a particular enterprise or business establishment. In this embodiment, clients 130 that are hardwired into the network may be located based on their assigned port identity. For example, a client 130 plugged into a specific port number may be associated with the location of that specific port within the locations of known ports throughout an enterprise computing environment 100. In another embodiment, the location module 270 determines a client 130 location based on an indoor positioning system (IPS). For example, the location module 270 can locate clients 130 throughout an enterprise computing environment 100 using sensory information such as radio waves, magnetic fields, and/or acoustic signals, or by determining a distance to nearby anchor nodes such as a WiFi access point. In yet another embodiment, the location module 270 simply receives location information that is manually entered by an administrator. For example, the location of each client 130 may be associated with a point within a coordinate map of an enterprise or business establishment, and the coordinates of each client 130 map the client's 130 location. In each embodiment, the location module 270 can determine a client's 130 location within an enterprise or business establishment and the client 130 can send its location to the client management server 110.

The network interface 220 comprises hardware, firmware, and/or software to facilitate communication with the network 120. The network interface 220 may utilize any conventional wired or wireless communication protocols or a custom communication protocol.

The I/O devices 230 include hardware, firmware, and/or associated software to enable users to provide inputs to the client 130 and to enable the client 130 to provide various outputs. For example, the I/O devices 230 may include input devices such as a touch sensor or touch panel, a keyboard or keypad, a mouse, a joystick, a gesture recognition system, a microphone, a voice recognition system, physical buttons, dials, or switches, or other input devices. In addition, the I/O devices 230 may include integrated output devices such as a display screen, a speaker, a haptic feedback device, or other output device. The I/O devices may also include communication ports to enable the client 130 to control external devices such as external displays, speakers, or communication devices. In one embodiment, the client 130 may include an external display screen that communicates with the client 130 through the I/O device 230.

The I/O devices 230 in the client 130 may also detect identifying information associated with people that are within proximity of the client 130. For example, the I/O device 230 may comprise a badge reader such as a magnetic strip reader or a radio-frequency identifier (RFID) sensor that detects an RFID fob or card held by an individual within proximity of a client 130. In one embodiment, the I/O device 230 may comprise a wireless communication device (e.g., a Bluetooth, WiFi Direct, or Near Field Communication (NFC) device) that is configured to detect a wireless signal from an administrative client 140 (e.g., a smartphone, tablet computer, or any such portable computing device) carried by an administrator within proximity of the client 130. For example, if a client 130 detects a wireless signal from an administrator client 140 carried by an administrator, the client 130 may send a signal to the client management server 110 indicating that the administrator client 140 is within proximity of the client 130. Upon receiving this signal, the client management server 110 may identify the client 130, the client's orientation and location, any external devices connected to the client 130, current and previous configurations of the client 130, and/or the identity of the administrator client 140. The client management server 110 can use this information to determine which configurations may apply to the client's 130 current state, which configurations have been most frequently provisioned to the client 130, and which configurations have been most frequently predicted for clients 130 associated with the administrator client 140, respectively.

The client application 250 comprises instructions that provide a client 130 with a particular functionality when executed by the processor 200. In the embodiment illustrated in FIG. 2, the client application 250 includes a provision management module 260 and storage for configuration parameters 240. The client application 250 may also include a graphical user interface that enables a user (e.g., an administrator) to access various features, which may be processed locally by the client application 250, remotely by the client management server 110, or as a combination thereof. The user interface may display various controls and menus that enable a user to interact with the enterprise computing environment 100. For example, the user interface of the client application 250 may include configuration fields that are prepopulated with configuration settings from the client management server 110 based on the orientation, previous configuration history, I/O connections, and location of the client 130. In this example, the user interface may include additional controls in which the user can confirm or reject the predicted configuration. In the event that the predicted configuration is rejected, the configuration fields may be made accessible to the user so that they may be modified to reflect the client's 130 intended functionality.

The provision management module 260 provides the client management server 110 with information from the orientation sensor 210, I/O devices 230, and any other component indicating the client's 130 state. The provision management module 260 collects information from the orientation sensor 210 indicating the client's orientation, and from the I/O devices 230 describing any external devices connected to the client 130. The provision management module 260 sends this collected information to the client management server 110 through the network interface 220. The provision management module 260 receives a predicted configuration from the client management server 110 which it uses to populate configuration fields as configuration parameters 240. Upon receiving a configuration, or having been initially deployed, the provision management module 260 monitors the client's 130 state (e.g., via orientation sensor 210 and I/O devices 230), and reports this information to the client management server 110. Additionally, the provision management module 260 can report any changes in the client's 130 state to the client management server 110, and the client 130 can receive provisioning that supports a different functionality.

The configuration parameters 240 comprise one or more parameters received from the client management server 110 that can be configured differently for respective clients 130 in order to affect their individual operating characteristics. Clients 130 may be configured with different configuration parameters 240 depending on the signals they provide to the client management server 100 (e.g., orientation, previous configuration history, location, and the like) and other information stored by the client management server 110. For example, clients 130 located near a meeting room may be configured with room management functionality. In addition, they may be further designated in terms of their location in relation to the meeting room. Room management clients 130 located inside a meeting room may be predicted to operate as "inside-type" clients 130 while room management clients 130 located outside of a meeting room may be configured to operate as "outside-type" clients 130. In another example, clients 130 oriented vertically (e.g., mounted on a vertical surface) may be provisioned with different configuration parameters 240 than clients 130 oriented right-side up to ensure that images are displayed in the appropriate orientation. In one embodiment, the configuration parameters 240 may also include factors such as a geographical location or building where the client 130 is located, a business unit associated with the location of the client 130, an access-level associated with the location of the client 130 (e.g., if the meeting room is a secure meeting room, a non-secure meeting room, or a publically available meeting room), or other factors that may relate to the desired operation of the client 130.

Figure 3:
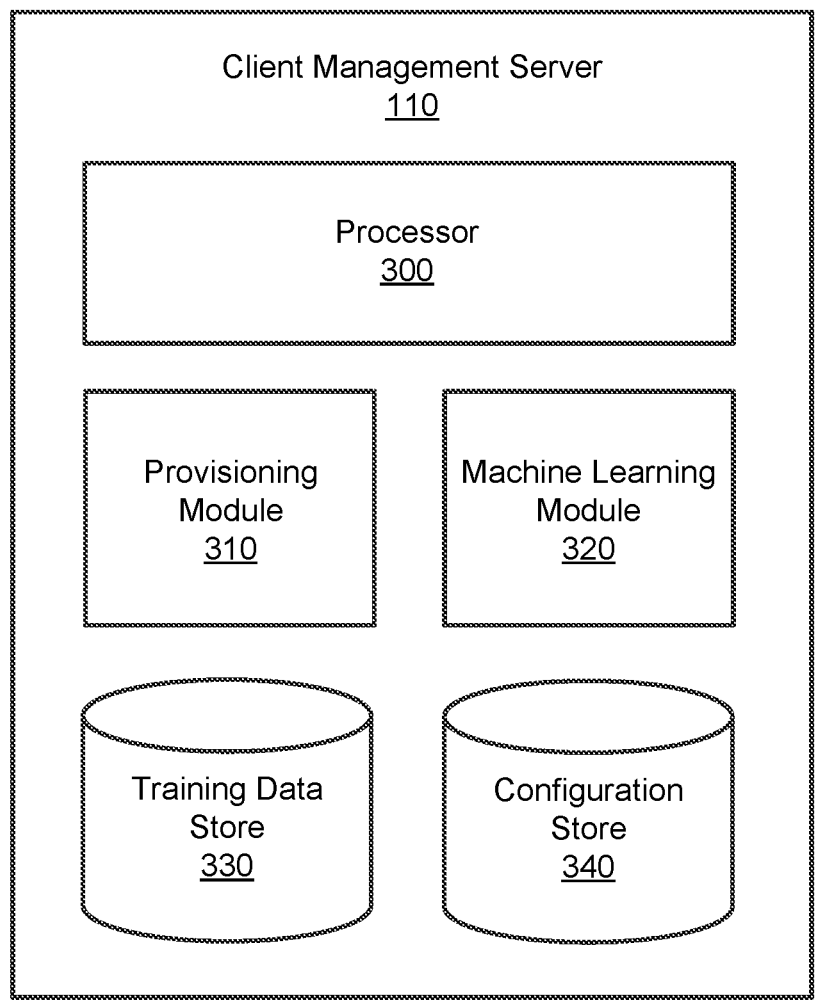
FIG. 3. is a block diagram of client management server in accordance with an embodiment.

FIG. 3 illustrates a client management server 110 used to provision a client 130, or clients 130, with a predicted configuration, according to one embodiment. In the embodiment illustrated in FIG. 3, the client management server 110 includes a processor 300, a provisioning module 310, a machine learning module 320, a training data store 330, and a configuration store 340. The client management server 110 can communicate with clients 130 over a network 120 in order to predict a configuration for each client 130 based on signals it receives from the clients 130 and other information at the client management server 110. This prediction is a "best guess" as to how each client 130 might be used. Upon predicting a configuration for a client 130, the client management server 110 can facilitate provisioning of the client 130 by populating configuration fields within a user interface used to provision the client 130. In one embodiment, the user interface and the associated configuration fields are located on an administrator client 140 that may be operated by an administrator to provision the client 130. In another embodiment the user interface and the associated configuration fields are located on the client 130 itself that is being provisioned. In both embodiments, an administrator can review the predicted configuration as outlined in the configuration fields and either send a confirmation signal to the client management server 110 or modify the configuration fields to support the intended functionality for the client 130. In other embodiments, the client 130 may automatically be provisioned based on the predicted configuration without an administrator necessarily providing confirmation. An administrator may then manually change the configuration, if desired, but need only take action if the desired configuration is different than the one predicted.

The provisioning module 310 can use information received from a client 130 over the network 120 to predict a configuration for the client 130 based on the received information. The provisioning module can identify numerous factors regarding the current state, and previous states, of each client 130 in order to make its prediction. For example, the provisioning module 310 can identify a client's 130 orientation from information provided by the provision management module 260 describing the client's 130 orientation as sensed by the orientation sensor 210 on the client 130. Similarly, the provision management module 260 can provide the provisioning module 310 with information describing the client's 130 location, I/O connections, whether a user (e.g., an administrator) is in proximity to or logged into the client 130, the identification of the user of the client 130, and which configurations were previously provisioned on the client 130.

In addition, the provisioning module 310 can identify whether a client 130 is a replacement for a previous client 130 that has moved or is being serviced. The provisioning module 310 can detect if a client 130 has gone offline (e.g., due to malfunction or damage) when its signals are no longer sent from the offline client 130. In one embodiment, if the provisioning module 310 detects a new client 130 at the same location (e.g., same port within network topology) and with the same orientation as that of the client 130 that went offline, the provisioning module 310 can determine that the new client 130 is a replacement for the client 130 that went offline. In the event that the client 130 is a replacement, the provisioning module 310 can also identify the configurations of the client 130 that went offline in order to provision the new client 130 with the same configuration. In another embodiment, the provisioning module 310 can identify clients 130 that are within a threshold proximity of one another. If four out of five clients 130, for example, have been provisioned and one has not yet received a configuration, the provisioning module 310 may determine that the client 130 without provisioning might be a replacement client 130 for a client 130 that has been removed from its location. In this example, the provisioning module 310 may examine the other nearby clients 130 for a shared configuration. If a shared configuration is not identified, the provisioning module 310 may determine that the client 130 that has not received a configuration is a replacement client 130 and may provision the replacement with the previous configuration of the client 130 that was removed.

In one embodiment, the provisioning module 310 can use information describing the orientation of a client 130, the location of a client 130, and I/O connections of a client 130 to determine its intended functionality. For example, the provisioning module 310 can identify if a client is oriented horizontally or vertically, where the client 130 is located within an enterprise or business establishment, and whether the client 130 is connected to an I/O device such as an external display screen. The provisioning module 310 can use this information to determine if the client 130 is intended to be used as a wayfinder, a room management device, a dashboard device, a sign-in kiosk, a digital sign, or a point of sale terminal, and provision the client 130 with a predicted configuration that supports the client's 130 intended functionality.

The wayfinder, outside-type room management, dashboard, and digital sign functionalities are associated with a client 130 that is mounted on a vertical surface. In one embodiment, the wayfinder, dashboard, and digital sign functionalities are further associated with a client 130 that is connected to an external display screen. Therefore, if the provisioning module 310 identifies that a client 130 is oriented vertically but is not connected to an external display screen, or another I/O device, the provisioning module can predict that the client 130 is intended to serve an outside-type room management functionality. The provisioning module 310 can use the location of a client 130 to distinguish the remainder of vertically-oriented clients that are connected to an external display screen. For example, if the provisioning module 310 identifies a client 130 that is oriented vertically, connected to an external display screen, and located in a lobby or foyer, the provisioning module 310 may predict that the client 130 is to be used as a digital sign. Similarly, if the provisioning module 310 determines that a client 130 is oriented vertically, connected to an external display screen, and is located in an office or among a group of desks, the provisioning module 310 may predict that the client 130 is most likely intended to be used as a dashboard. If a similar client 130 is oriented vertically, connected to an external display screen, but is located in a hallway, or other corridor through which people might pass, the provisioning module 310 may predict that the client 130 is most likely intended to be used for wayfinding. The dashboard and wayfinder functionalities may be further distinguished in that wayfinder clients 130 are connected to the internet and dashboard clients 130 are not. In addition, wayfinder clients 130 are typically deployed in specific locations known by administrators of an enterprise or business establishment when an enterprise computing environment 100 is commissioned. Dashboard clients 130 are typically deployed at a date subsequent to that of wayfinder client 130 deployment. Therefore, if the provisioning module 310 detects a new vertical device that is connected to an external display screen, the provisioning module 310 can predict that the client 130 is most likely intended to be used as a dashboard. In other embodiments, the wayfinder, dashboard, outside-type room management, and digital sign functionalities may or may not utilize I/O devices such as an external display screen.

The inside-type room management, sign-in kiosk, and point of sale terminal functionalities are associated with a client 130 that is oriented horizontally. In one embodiment, the inside-type room management, sign-in kiosk, and point of sale terminal are further associated with a client 130 that is not connected to an external display screen or another I/O device. Because each of these functionalities is supported by a client 130 that is positioned horizontally and not connected to an external display screen, the provisioning module 310 can use the location of a client 130, in addition to orientation and I/O connection, to predict an intended functionality for the client 130. For example, if a client 130 is oriented right-side up (e.g., positioned horizontally), not connected to an external display screen, and located in a foyer or lobby of an enterprise or business establishment, the provisioning module 310 may predict that the client 130 is to be used as a sign-in kiosk. If the provisioning module 310 identifies a similar client 130 oriented horizontally, not connected to an external display screen, and located in a meeting room or conference room, the provisioning module 310 can determine that the client 130 is to be used as an inside-type room management client 130. Similarly, if a client 130 is oriented horizontally, not connected to an external display screen, and located in a café or retail environment, the provisioning module 310 can predict a point of sale terminal configuration for the client 130. In this way, the provisioning module 310 can use a combination of orientation, I/O connections, and location signals from a client 130 to predict the client's 130 intended functionality. In other embodiments, the inside-type room management, sign-in kiosk, and point of sale terminal functionalities may or may not utilize I/O devices such as an external display screen. In addition, the predicted configuration may be based on additional, fewer, or different signals.

In one embodiment, the provisioning module 310 can predict a configuration for a client 130 based on a history of predicted configurations provisioned to the client 130. For example, the provisioning module 310 can determine a series of configuration events for a given client 130. Within this series, the provisioning module 310 can identify an order in which each configuration event occurred. The provisioning module 310 can identify patterns of configurations within this order if certain consecutive configurations appear repeatedly within the series. For example, if a client 130 was provisioned to support a wayfinder functionality, followed by a dashboard functionality in an alternating, repeated order, the provisioning module 310 can determine that a configuration pattern exists for that client 130. In the event that a pattern is discovered, the provisioning module 310 need only predict the next configuration in the configuration pattern to provision to the client 130. In one embodiment, the series of configuration events is sent by the client 130 to the provisioning module 310. In another embodiment, the series of configuration events is assembled by the provisioning module 310 using information stored in the configuration store 340.

In one embodiment, the provisioning module 310 can make configuration predictions based on the frequency at which a particular configuration is provisioned across clients 130. For example, if 1,000 clients 130 are provisioned with configurations, the provisioning module 310 can identify the frequency at which each respective functionality was assigned to each respective client 130. In this example, if 500 of the clients 130 are configured to serve room management functionalities, 400 of the clients 130 are configured to serve as wayfinders, and 100 of the clients 130 are configured to serve as sign-in kiosks, the provisioning module 310 can identify the room management configuration as the most frequently provisioned. In the event that a new client 130 shares orientation, external device connection, and location information with that associated with room management, the provisioning module 310 may predict that the new client 130 is to serve a room management functionality as well, and provision the new client 130 accordingly. In another embodiment, the provisioning module 310 can make predictions in a manner similar to a branch predictor circuit. In this embodiment, the provisioning module 310 does not necessarily predict a configuration based solely on a pattern, but might weigh the likelihood of each configuration based on a series of states associated with each configuration. For example, as a configuration is selected for provisioning, the provisioning module 310 can increment a counter associated with that configuration and store this number, or associated metadata, with the configuration in the configuration store 340. In addition, if a configuration is not selected, its counter may be decremented and stored as well. In this example, the configuration with the highest counter can be selected for a predicted configuration.

In addition, the provisioning module 310 can base its prediction for a client 130 on the context of other nearby clients 310. For example, if a client 130 is located in an office or meeting room, the provisioning module 310 can identify clients 130 in other rooms adjacent to the meeting room. If the other clients 130 share a configuration (e.g., room management functionality), the provisioning module 310 may predict that the client 130 is to be provisioned with this shared configuration. In another example, the provisioning module 310 can receive a signal from an administrator client 140 indicating an area encompassing the administrator client 140 (e.g., as detected via Bluetooth beacon or any other location-sensing technology). The provisioning module 310 can identify a client 130, or clients 130, within this area based on stored information (e.g., in the configuration store 340) describing the location of each client 130 within the enterprise computing system 100, and can generate a list (or equivalent data structure) including each identified client 130. From this list, the provisioning module can identify a client 130, or clients 130, that have not yet received a configuration, and can predict a configuration for the client 130, or clients 130, based on received state information (e.g., orientation, I/O connections, and location). In this way, the provisioning module can select an available client 130, or clients 130, closest to a user (e.g., administrator) and can quickly provision the client 130, or clients 130, for use.

The machine learning module 320 trains one or more prediction models used by the provisioning module 310 to predict a configuration for clients 130 based on training data from the training data store 330. The machine learning module 320 can store the trained prediction models in the training data store 330 and periodically retrain the prediction models using features based on updated training data. The machine learning module 320 can use features such as a client's 130 history of provisioned configurations (e.g., former configuration predictions from the client management server 110) and a history of the accuracy associated with former configuration predictions made for each configuration to train a machine learning model. For example, each instance in which a confirmation was received from an administrator client 140 can indicate a successful configuration prediction for a given configuration. Conversely, each instance in which an administrator modified a prediction can indicate a failed configuration prediction. These metrics may be used by the machine learning module 320 to train a model that may improve configuration predictions to further expedite the provisioning of clients 130. In addition, features such as a history of provisioned configurations pertaining to a particular orientation, external device connection, and location, can be used by the machine learning module to train a prediction model. For example, the client management server 110 can collect the orientation, external device connection, and location information of a new client 130 and apply a prediction model to the collected information that can assist the client management server 110 in predicting a configuration given previous predictions for clients 130 in the same state (e.g., orientation, location, etc.). In one embodiment, the machine learning module 320 trains the prediction models using one or more machine learning algorithms such as neural networks, naïve Bayes, and support vector machines with the training data stored in the training data store 330.

The configuration store 340 comprises a list of all possible configurations, and associated metadata, that might be provisioned to a client 130. These possible configurations consist of particular configuration parameters that may be provisioned to a client 130 by populating configuration fields specifying a particular functionality assigned to the client 130. For example, the configuration store 340 may store configuration parameters pertaining to wayfinding, room management, sign-in kiosk, dashboard, digital sign, and point of sale terminal functionalities. In addition, the configuration store 340 may store additional metadata with the configurations indicating a number of provisioning events that occurred for each configuration, identified users (e.g., administrators) that confirmed a predicted configuration for each configuration, the identity of clients 130 within an enterprise computing environment 100 provisioned with each configuration, and the like. Upon identifying signals from a client 130, the provisioning module 310 examines the list of possible configurations in the configuration store 340 as well as the metadata associated with each possible configuration. Based on various combinations of this information, the provisioning module 310 can make a selection that best supports the identified signals from the client 130. This selection from the configuration store 340 constitutes a predicted configuration, and the predicted configuration is provisioned to the client 130.

Figure 4:
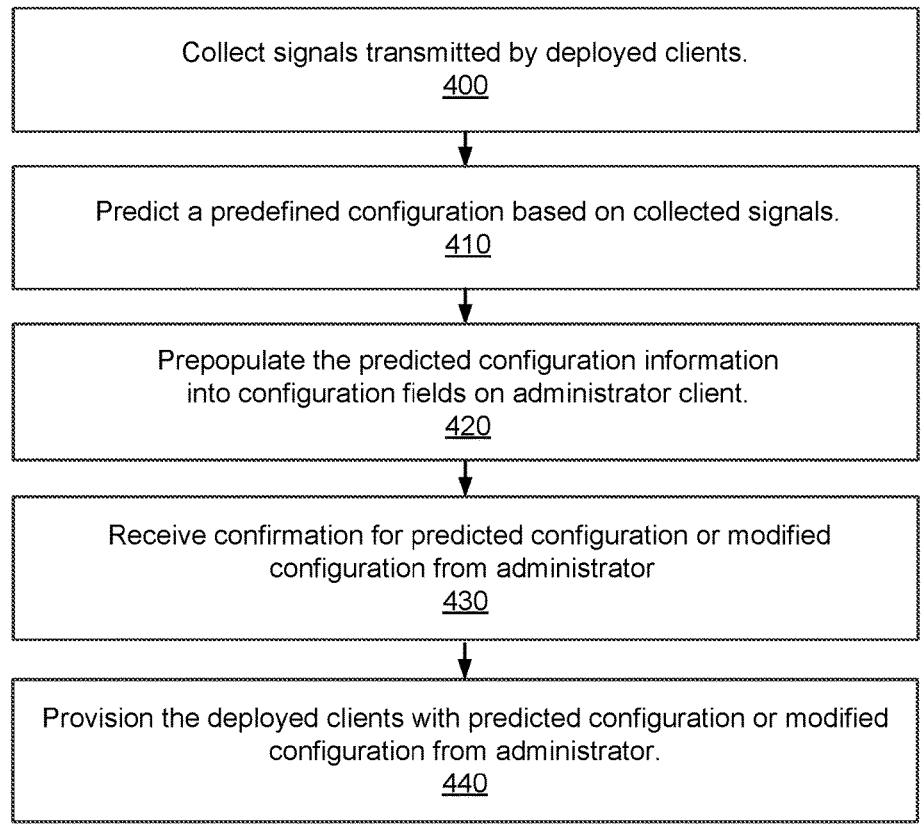
FIG. 4 is a flowchart illustrating a process for configuring client devices in accordance with an embodiment.

FIG. 4 is a flowchart illustrating a process for provisioning a client 130 with a predicted configuration, according to one embodiment. In the embodiment illustrated in FIG. 4, the client management server 110 collects 400 signals transmitted by deployed clients 130 (e.g., orientation of a client 130, location of a client 130, I/O device 230 signals from a client 130, etc.). The client management server 110 can predict 410 a predefined configuration based on these collected signals. The client management server 110 can retrieve the predefined configuration from the configuration store 340 and prepopulate 420 the predicted configuration information into configuration fields on an administrator client 140. The client management server 110 can receive 430 confirmation from an administrator that the predicted configuration is correct, or receive a version of the predicted configuration that was modified by the administrator to reflect the intended use of the client 130. Lastly, the client management server 110 can provision 440 the deployed clients with either the predicted configuration or the modified configuration from the administrator, thus providing the client 130 with its intended functionality.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A computer-implemented method comprising:
collecting a plurality of signals transmitted by a plurality of client devices, the plurality of signals describing state information of the plurality of client devices;
predicting, for a target client device, a configuration selected from a plurality of possible configurations, the predicting based on the collected plurality of signals;
prepopulating a plurality of configuration fields of a user interface with the predicted configuration, the user interface displayed on an administrator client;
receiving, from the administrator client, a signal describing a confirmation of a correct predicted configuration or a signal describing a modified configuration, the modified configuration generated by an administrator on the administrator client responsive to an incorrect predicted configuration; and
configuring the target client device with a final configuration, the final configuration comprising the predicted configuration or the modified configuration;
wherein the state information in the plurality of signals indicates at least one of orientation, location, nearby users, and attachments to external devices of the plurality of client devices.

2. The computer-implemented method of claim 1, wherein predicting the configuration from the plurality of possible configurations comprises:
receiving, from the state information, a signal from the administrator client, the signal describing an area encompassing a location of the administrator client;
generating a list describing each of the plurality of client devices located within the described area, the generating based on stored information describing locations of the plurality of client devices;
selecting, from the generated list, a client device that has not been configured with a final configuration; and
predicting, from the plurality of possible configurations, a configuration for the selected client device, the predicting based on the collected plurality of signals.

3. The computer-implemented method of claim 2, wherein the signal describing the area encompassing the location of the administrator client is generated by a Bluetooth beacon or any other location-sensing technology.

4. The computer-implemented method of claim 1, wherein predicting the configuration from the plurality of possible configurations comprises:
receiving, from the state information, from each of the plurality of client devices, a signal describing a current configuration, the current configuration describing a configuration currently provisioned to each of the plurality of client devices;
determining one or more frequencies associated with each current configuration, each of the one or more frequencies indicating a number of configuration events for each configuration from the plurality of possible configurations;
determining a configuration from the plurality of possible configurations having a highest frequency of the one or more frequencies;
selecting the configuration from the plurality of possible configurations having the highest frequency of the one or more frequencies.

5. The computer-implemented method of claim 1, wherein predicting the configuration from the plurality of possible configurations comprises:
determining a pattern of configuration events for a local set of client devices located within a predefined area corresponding to a location of the target device, the pattern of configuration events comprising a sequence of configurations applied to the local set of client devices; and
predicting a configuration of the target device based on the determined pattern.

6. The computer-implemented method of claim 1, wherein predicting the configuration from the plurality of possible configurations comprises:
receiving, from the state information, for each of the plurality of client devices, a signal describing an orientation of a client device, the orientation of the client device indicating either a first orientation or a second orientation;

predicting, from the plurality of possible configurations, a configuration for the target client device, the predicted configuration comprising one of:
  a first configuration responsive to the received signal describing a first orientation; or
  a second configuration responsive to the received signal describing a second orientation.

7. The computer-implemented method of claim 6, wherein the orientation of the client devices is determined by a gyroscope located inside each of the plurality of client devices, the gyroscope indicating:
  the first orientation corresponding to a client device mounted vertically on a vertical surface; or
  the second orientation corresponding to a client device placed horizontally on a flat surface.

8. The computer-implemented method of claim 1, wherein configuring the target client device with the final configuration comprises provisioning the target client device with a particular functionality, the particular functionality comprising:
  a wayfinding functionality;
  a room management functionality;
  a dashboard functionality;
  a sign-in kiosk functionality;
  a digital sign functionality; or
  a point of sale terminal functionality.

9. The computer-implemented method of claim 1, wherein responsive to an indication that a set of one or more client devices have been replaced by one or more replacement client devices:
  predicting a configuration of the one or more replacement client devices, the predicting based on a previously collected plurality of signals transmitted by the set of one or more client devices;
  prepopulating a plurality of configuration fields of a user interface with the predicted configuration, the user interface displayed on an administrator client;
  receiving, from the administrator client, a signal describing a confirmation of a correct predicted configuration or a signal describing a modified configuration, the modified configuration generated by an administrator on the administrator client responsive to an incorrect predicted configuration; and
  configuring each of the one or more replacement client devices with a final configuration, the final configuration comprising the predicted configuration or the modified configuration.

10. The computer-implemented method of claim 1, wherein each signal of the plurality of signals describing the plurality of client devices includes an indication of a connection to an external display or any other external devices connected to a client device.

11. A non-transitory computer readable storage medium having instructions encoded thereon that, when executed by a processor, cause the processor to perform the steps including:
  collecting a plurality of signals transmitted by a plurality of client devices, the plurality of signals describing state information of the plurality of client devices;
  predicting a configuration from a plurality of possible configurations, the predicting based on the collected plurality of signals;
  prepopulating a plurality of configuration fields of a user interface with the predicted configuration, the user interface displayed on an administrator client;
  receiving, from the administrator client, a signal describing a confirmation of a correct predicted configuration or a signal describing a modified configuration, the modified configuration generated by an administrator on the administrator client responsive to an incorrect predicted configuration; and
  configuring a target client device with a final configuration, the final configuration comprising the predicted configuration or the modified configuration;
  wherein the state information in the plurality of signals indicates at least one of orientation, location, nearby users, and attachments to external devices of the plurality of client devices.

12. The non-transitory computer readable storage medium of claim 11, wherein predicting the configuration from the plurality of possible configurations comprises:
  receiving, from the state information, a signal from the administrator client, the signal describing an area encompassing a location of the administrator client;
  generating a list describing each of the plurality of client devices located within the described area, the generating based on stored information describing locations of the plurality of client devices;
  selecting, from the generated list, a client device that has not been configured with a final configuration; and
  predicting, from the plurality of possible configurations, a configuration for the selected client device, the predicting based on the collected plurality of signals.

13. The non-transitory computer readable storage medium of claim 12, wherein the signal describing the area encompassing the location of the administrator client is generated by a Bluetooth beacon or any other location-sensing technology.

14. The non-transitory computer readable storage medium of claim 11, wherein predicting the configuration from the plurality of possible configurations comprises:
  receiving, from the state information, for each of the plurality of client devices, a signal describing an orientation of a client device, the orientation of the client device indicating either a first orientation or a second orientation;
  predicting, from the plurality of possible configurations, a configuration for the target client device, the predicted configuration comprising one of:
    a first configuration responsive to the received signal describing a first orientation; or
    a second configuration responsive to the received signal describing a second orientation.

15. The non-transitory computer readable storage medium of claim 14, wherein the orientation of the client devices is determined by a gyroscope located inside each of the plurality of client devices, the gyroscope indicating:
  the first orientation corresponding to a client device mounted vertically on a vertical surface; or
  the second orientation corresponding to a client device placed horizontally on a flat surface.

16. The non-transitory computer readable storage medium of claim 11, wherein configuring the target client device with the final configuration comprises provisioning the target client device with a particular functionality, the particular functionality comprising:
  a wayfinding functionality;
  a room management functionality;
  a dashboard functionality;

a sign-in kiosk functionality;
a digital sign functionality; or
a point of sale terminal functionality.

17. The non-transitory computer readable storage medium of claim 11, wherein responsive to an indication that a set of one or more client devices have been replaced by one or more replacement client devices:
  predicting a configuration of the one or more replacement client devices, the predicting based on a previously collected plurality of signals transmitted by the set of one or more client devices;
  prepopulating a plurality of configuration fields of a user interface with the predicted configuration, the user interface displayed on an administrator client;
  receiving, from the administrator client, a signal describing a confirmation of a correct predicted configuration or a signal describing a modified configuration, the modified configuration generated by an administrator on the administrator client responsive to an incorrect predicted configuration; and
  configuring each of the one or more replacement client devices with a final configuration, the final configuration comprising the predicted configuration or the modified configuration.

18. A system comprising:
a computer processor; and
a computer-readable storage medium coupled to the computer processor, the computer-readable storage medium storing executable code, the code when executed by the computer processor performs steps comprising:
  collecting a plurality of signals transmitted by a plurality of client devices, the plurality of signals describing state information of the plurality of client devices;
  predicting a configuration from a plurality of possible configurations, the predicting based on the collected plurality of signals;
  prepopulating a plurality of configuration fields of a user interface with the predicted configuration, the user interface displayed on an administrator client;
  receiving, from the administrator client, a signal describing a confirmation of a correct predicted configuration or a signal describing a modified configuration, the modified configuration generated by an administrator on the administrator client responsive to an incorrect predicted configuration; and
  configuring a target client device with a final configuration, the final configuration comprising the predicted configuration or the modified configuration;
  wherein the state information in the plurality of signals indicates at least one of orientation, location, nearby users, and attachments to external devices of the plurality of client devices.

19. The system of claim 18, wherein predicting the configuration from the plurality of possible configurations comprises:
  receiving, from the state information, a signal from the administrator client, the signal describing an area encompassing a location of the administrator client;
  generating a list describing each of the plurality of client devices located within the described area, the generating based on stored information describing locations of the plurality of client devices;
  selecting, from the generated list, a client device that has not been configured with a final configuration; and
  predicting, from the plurality of possible configurations, a configuration for the selected client device, the predicting based on the collected plurality of signals.

20. The system of claim 18, wherein responsive to an indication that a set of one or more client devices have been replaced by one or more replacement client devices:
  predicting a configuration of the one or more replacement client devices, the predicting based on a previously collected plurality of signals transmitted by the set of one or more client devices;
  prepopulating a plurality of configuration fields of a user interface with the predicted configuration, the user interface displayed on an administrator client;
  receiving, from the administrator client, a signal describing a confirmation of a correct predicted configuration or a signal describing a modified configuration, the modified configuration generated by an administrator on the administrator client responsive to an incorrect predicted configuration; and
  configuring each of the one or more replacement client devices with a final configuration, the final configuration comprising the predicted configuration or the modified configuration.

* * * * *